United States Patent [19]

Tyrell et al.

[11] Patent Number: 4,569,973

[45] Date of Patent: Feb. 11, 1986

[54] COPOLYETHERESTERS FROM CAPROLACTONE

[75] Inventors: John A. Tyrell, Mt. Vernon; Victor Mark, Evansville, both of Ind.

[73] Assignee: General Electric Company, Pittsfield, Mass.

[21] Appl. No.: 643,985

[22] Filed: Aug. 24, 1984

[51] Int. Cl.[4] .............................................. C08G 63/76
[52] U.S. Cl. .................................... 525/437; 524/101; 524/604; 524/605; 528/301; 528/302
[58] Field of Search ................ 528/301, 302; 525/437; 524/101, 604, 605

[56] References Cited

U.S. PATENT DOCUMENTS

| | | | |
|---|---|---|---|
| 3,331,890 | 7/1967 | Caldwell et al. | 260/860 |
| 3,489,819 | 1/1970 | Busler | 260/823 |
| 3,502,623 | 3/1970 | Hurworth et al. | 260/76 |
| 3,761,511 | 9/1973 | Nakahara et al. | 260/482 B |
| 3,835,089 | 9/1974 | Fox et al. | 260/40 R |
| 3,975,323 | 8/1976 | Georgoudis et al. | 260/22 D |
| 4,031,165 | 6/1977 | Saiki et al. | 260/860 |
| 4,052,368 | 10/1977 | Larson | 528/301 X |
| 4,078,148 | 3/1978 | Volkommer et al. | 560/185 |
| 4,130,603 | 12/1978 | Tanaka et al. | 528/301 |
| 4,160,789 | 7/1979 | Radici et al. | 525/411 |
| 4,189,421 | 2/1980 | Shay et al. | 524/604 X |
| 4,251,652 | 2/1981 | Tanaka et al. | 528/301 X |
| 4,396,746 | 8/1983 | Toga | 528/301 X |
| 4,415,728 | 11/1983 | Tremblay | 528/279 |
| 4,436,896 | 3/1984 | Okamoto et al. | 528/301 X |
| 4,442,262 | 4/1984 | Yusa et al. | 525/69 |

FOREIGN PATENT DOCUMENTS 0095189 11/1983 European Pat. Off. .

*Primary Examiner*—Lucille M. Phynes
*Attorney, Agent, or Firm*—Edward K. Welch, II; William F. Mufatti; John W. Harbour

[57] ABSTRACT

Novel copolyetherester elastomer molding compositions are prepared from diols, diacids, poly(alkylene ether) glycol and caprolactone or polycaprolactone.

19 Claims, No Drawings

COPOLYETHERESTERS FROM CAPROLACTONE

The present invention relates to novel copolyetherester elastomeric thermoplastic molding compositions derived from dicarboxylic acids, aliphatic and/or cycloaliphatic diols, poly(alkylene ether) glycols and caprolactone. These compositions exhibit an excellent combination of physical properties typified by enhanced toughness, flexural strength and elongation with low flexural modulus and are particularly useful for the production of finished products by such techniques as injection molding, blow molding, rotational molding and the like.

Copolyetherester elastomers are well known. Generally, they are prepared by conventional esterification/condensation processes for the preparation of polyesters from diols, dicarboxylic acids and poly(alkylene ether) glycols of molecular weight of from 350–6000. Such copolyetheresters and their methods of production are described in, for example, U.S. Pat. Nos. 3,023,123; 3,763,109; 3,651,014; 3,766,146 and 3,663,653 and are available from a number of sources commercially including E. I. duPont under the trademark Hytrel.

Novel copolyetherester elastomers have now been found which are particularly suited for molding applications and are characterized as having one or more of the following enhanced properties: toughness, flexural strength and elongation at low flexural modulus.

The novel copolyetherester elastomers of the present invention may be either random or block and are prepared by conventional processes from (a) one or more diols, (b) one or more dicarboxylic acids, (c) one or more poly(alkylene ether) glycols, and (d) caprolactone. Preferred compositions encompassed by the present invention may be prepared from (a) one or more $C_2$–$C_{15}$ aliphatic and/or cycloaliphatic diols, (b) one or more $C_4$–$C_{16}$ aliphatic, cycloaliphatic, and/or aromatic dicarboxylic acids or ester derivatives thereof, (c) poly(tetramethylene ether) glycol of molecular weight of 400–6000 and (d) caprolactone and/or polycaprolactone. Generally, the combined weight of poly(alkylene ether) glycol and caprolactone will be from about 5 to about 65% by weight based on the total composition and the poly(alkylene ether) glycol and caprolactone will each be present in an amount of from about 2 to about 50% by weight based on the total composition. The compositions may contain and preferably do contain stabilizers and the like.

Low molecular weight diols which are suitable for use in preparing the compositions of the present invention are saturated and/or unsaturated aliphatic, cycloaliphatic, and aromatic dihydroxy compounds having a molecular weight of 250 or less. Preferred are diols with 2–15 carbon atoms such as ethylene, propylene, tetramethylene, pentamethylene, 2-methyl trimethylene, 2,2-dimethyltrimethylene, hexamethylene and decamethylene glycols; dihydroxy cyclohexane; cyclohexane dimethanol; resorcinol; hydroquinone; 1,5-dihydroxy naphthalene, or mixtures of any one or more of these diols with unsaturated diols such as butene-diol, hexene-diol, etc. Especially preferred are saturated aliphatic diols, mixtures thereof or a mixture of a saturated diol(s) with an unsaturated diol(s), each diol containing 2–8 carbon atoms. Included among the aromatic dihydroxy compounds which can be used are 4,4' dihydroxy diphenyl, bis(p-hydroxyphenyl)methane, and bis(p-hydroxyphenyl) 2,2-propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids which are suitable for use in the practice of the present invention are aliphatic, cycloaliphatic, or aromatic dicarboxylic acids. These acids are preferably of a low molecular weight, i.e., having a molecular weight of less than about 300; however, higher molecular weight dicarboxylic acids, especially dimer acid may also be used. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight preference, mentioned above, pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used for this invention are sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, dimer acid, 4-cyclohexene-1,2-dicarboxylic acid, 2-ethylsuberic acid, tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexanedicarboxylic acids, sebacic acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, oxybis(benzoic acid), ethylenebis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4-sulfonyl dibenzoic acid, and halo and $C_1$–$C_{12}$ alkyl, alkoxy, and aryl ring substitution derivatives thereof.

Aromatic dicarboxylic acids are an especially preferred class for preparing the copolyetherester polymers of this invention. Among the aromatic acids, those with 8–16 carbon atoms are preferred, particularly the benzene dicarboxylic acids, i.e., phthalic, terephthalic and isophthalic acids and their dimethyl derivatives. Especially preferred is dimethyl terephthalate.

The poly(alkylene ether) glycols used in the preparation of the novel copolymers of the present invention are long-chain polymeric glycols having terminal hydroxy groups and a molecular weight of from about 400 to about 6000. Additionally, these poly(alkylene ether) glycols will have a carbon-to-oxygen ratio of from about 2.0 to 4.3.

Representative long-chain ether glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3). Especially preferred is poly(tetramethylene ether) glycol of molecular weight of from about 900 to about 2500.

Caprolactones suitable for use herein are widely available commercially, e.g., Union Carbide Corporation and Aldrich Chemicals. While epsilon caprolactone is especially preferred, it is also possible to use substituted caprolactones wherein the epsilon caprolactone is substituted by a lower alkyl group such as methyl or ethyl group at the alpha, beta, gamma, delta or epsilon positions. Additionally, it is possible to use polycaprolactone, including homopolymers and copolymers thereof with one or more components as well as hydroxy terminated polycaprolactone, as block units in the novel copolyetheresters of the present invention. Suitable polycaprolactones and processes for their production are described in, for example, U.S. Pat. Nos. 3,761,511; 3,767,627 and 3,806,495, herein incorporated by reference.

In general, as set forth above, the compositions of the present invention are prepared from (a) one or more diols, (b) one or more dicarboxylic acids or ester derivatives thereof, (c) one or more poly(alkylene ether) glycols and (d) caprolactone or polycaprolactone. Preferred compositions will consist essentially of the reaction products of (a) one or more $C_2$ to $C_{15}$, most preferably $C_2$ to $C_8$, aliphatic diols, (b) one or more $C_8$ to $C_{16}$ aromatic dicarboxylic acids, (c) poly(tetramethylene ether) glycol having a molecular weight of from 400 to 6000 and (d) epsilon caprolactone or polyepsiloncaprolactone or hydroxyl terminated derivatives thereof. In its most preferred embodiment, the compositions consist essentially of the reaction products of butanediol, having 0 to 40 mole percent based on total moles of diols, of a second diol, (b) terephthalic acid or the dimethyl ester derivative thereof, (c) poly(tetramethylene ether) glycol of molecular weight of from about 900 to about 2500 and (d) epsilon caprolactone.

While compositions prepared from the above components in any combination are novel, it is preferred that the compositions contain, based on 100 weight percent, from about 5 to about 65%, preferably from about 10 to about 65%, by weight of poly(alkylene ether) glycol and caprolactone combined and wherein the poly(alkylene ether) glycol and the caprolactone are each present in an amount of from about 2 to about 50%, preferably from about 5 to about 50%, by weight based on the total compositions. While compositions outside of these ranges are possible and useful, such compositions having greater than about 50% by weight poly(alkylene ether) glycol tend to be more beneficial for adhesive type applications and are too soft for most molding applications contemplated for applicants' preferred compositions.

In its most preferred embodiments, the compositions of the present invention consist essentially of from about 20 to about 50% by weight of poly(alkylene ether) glycol and caprolactone combined and wherein each of the foregoing is present in an amount of from about 10 to about 30% by weight.

The novel polymers described herein may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547, herein incorporated by reference. Additionally, these compositions may be prepared by such processes and other known processes to effect random copolymers, block copolymers or hybrids thereof wherein both random and block units are present.

Although the novel copolyetheresters of the present invention possess many desirable properties, it is advisable to stabilize certain of the compositions to heat, oxidation, radiation by UV light and the like. This can be accomplished by incorporating stabilizer materials into the compositions either during production or while in a hot melt stage following polymerization. The particular stabilizers useful herein are any of those known in the art which are suitable for copolyetheresters.

Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 3,5-di-tert-butyl-4-hydroxy hydrocinnamic triester with 1,3,5-tris-(2-hydroxyethyl-s-triazine-2,4,6-(1H,3H,5H)trione; 4,4'-bis(2,6-ditertiary-butylphenyl); 1,3,5-trimethyl-2,4,6-tris-(3,5-ditertiary-butyl-4-hydroxybenzyl)benzene and 4,4'-butylidene-bis(6-tertiary-butyl-m-cresol). Various inorganic metal salts or hydroxides can be used as well as organic complexes such as nickel dibutyl dithiocarbonate, manganous salicylate and copper 3-phenyl-salicylate. Typical amine stabilizers include N,N'-bis(beta-naphthyl)-p-phenylene diamine; N,N'-bis(1-methylheptyl)-p-phenylene diamine and either phenyl-beta-naphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

The copolyetherester compositions of the present invention may also be rendered flame retardant by use of suitable flame retardant agents. Suitable flame retardant agents are as disclosed in U.S. Pat. Nos. 3,751,400; 3,855,277 and 3,975,905. Especially preferred are the polymeric and oligomeric flame retardant agents comprising tetra-bromobisphenol-A carbonate units, see for example U.S. Pat. No. 3,833,685. All of the aforementioned patents are incorporated herein by reference. Other preferred flame retardant agents are known in the art and include, for example, brominated epoxy compounds. It is also contemplated that the foregoing flame retardants may be used in combination with synergists including for example antimony compounds.

Further, the properties of these polyesters can be modified by incorporation of various conventional inorganic fillers such as carbon black, silica gel, alumina, clays and chopped fiberglass. These may be incorporated in amounts up to 50% by weight, preferably up to about 30% by weight. In general, these additives have the effect of increasing the modulus of the material at various elongations.

DETAILED DESCRIPTION OF THE PREFERRED EMBODIMENTS

The following examples are presented as illustrative of the present invention and are not to be construed as limiting thereof.

EXAMPLE 1

Into a reaction vessel equipped with a mechanical stirrer were placed, in parts by weight, the following:
- 35 parts dimethyl terephthalate
- 18 parts caprolactone
- 29 parts 1,4 butanediol
- 14 parts poly(tetramethylene ether) glycol (average MW 2000)
- 1 part stabilized antioxidant The reaction vessel and thus the above ingredients were heated to 180° C. Once the temperature of the reaction mix reached 165° C. a titanate esterification/condensation catalyst was added. Methanol was distilled off from the reaction and the temperature gradually raised (over a period of about one hour) to about 250° C. Vacuum was applied and the reaction continued until the desired viscosity was reached. During this time, the temperature was maintained at about 250° C. and the vacuum was usually at less than about 1 mmHg. The vacuum distillates contained mainly butanediol which is charged in excess but some caprolactone was also removed. After reaction, the vacuum was broken with nitrogen and the resultant polymer removed for testing. The polymer so produced had a melt viscosity of 2,500 poise at 250° C. and a Tm of 153° C.

EXAMPLES 2-8

A series of polymers were prepared according to the process of Example 1, however, the weight percentages and formulation of each was varied to demonstrate the broad applicability of the present invention. The specific formulations and properties of the resultant polymers were as shown in Table 1.

TABLE 1

| Example | 2 | 3 | 4* | 5 | 6 | 7 | 8 |
|---|---|---|---|---|---|---|---|
| Dimethyterephthalate | 38 | 38 | 38 | 32 | 31 | 44 | 39 |
| 1,4 Butanediol | 29 | 29 | 29 | 27 | 31 | 34 | 30 |
| Caprolactone | 16 | 14 | 16 | 16 | 16 | 5 | 10 |
| Poly(tetramethylene ether)glycol (MW 2000) | 16 | 18 | 16 | 16 | 16 | 16 | 20 |
| Dimethylisophthalate | — | — | — | 6 | — | — | — |
| 1,6 hexanediol | — | — | — | 2 | — | — | — |
| Dimethylazelate | — | — | — | — | 6 | — | — |
| Stabilizer | 1 | 1 | 1 | 1 | 1 | 1 | 1 |

TABLE 1-continued

| Example | 2 | 3 | 4* | 5 | 6 | 7 | 8 |
|---|---|---|---|---|---|---|---|
| Melt Viscosity Poise at 250° C. | 1400 | 2400 | 2600 | 1600 | 1100 | 1900 | 5500 |
| Tm (°C.) | 152 | 161 | 149 | 126 | 133 | 196 | 177 |

*Example 4 used Poly(tetramethylene ether) glycol of average MW 1000

EXAMPLE 9

An additional example was run demonstrating the use of polycaprolactone, in place of caprolactone, within the embodiment of the present invention.

The polymer so prepared was the reaction product of:
- 39 parts dimethylterephthalate
- 30 parts 1,4 butanediol
- 22 parts poly(tetramethylene ether) glycol ave. MW 1000)
- 7 parts hydroxy terminated polycaprolactone (ave. MW 1250)
- 1 part Stabilizer The resultant polymer had a flexural modulus of 20,000 psi, a melt viscosity of 7400 poise at 250° C. and melt temperature of 176° C.

Obviously, other modifications and variations of the present invention are possible in light of the above teachings. It is, therefore, to be understood that changes may be made in the particular embodiments of the invention described which are within the full intended scope of the invention as defined by the appended claims.

We claim:

1. A copolyetherester elastomer molding composition consisting essentially of the reation product of: (a) 1,4butanediol or a mixture thereof with up to 40 mole % of a second diol; (b) one or more dicarboxylic acids; (c) one or more poly(alkylene ether) glycols having an average molecular weight of from about 400 to 6000; and, (d) caprolactone or polycaprolactone wherein the weight percent, based on the total composition, of poly(alkylene ether) glycol and caprolactone component (d) combined is from about 5 to about 65 and the weight percent of poly(alkylene ether) glycol and caprolactone component (d) each is from about 2 to about 50, based on the total composition.

2. The composition of claim 1 wherein the weight percent of poly(alkylene ether) glycol and caprolactone or polycaprolactone is from about 10 to about 65% and each of the poly(alkylene ether) glycol and caprolactone or polycaprolactone is present in an amount of from about 5 to 50% by weight based on the total composition.

3. The composition of claim 1 wherein the weight percent of poly(alkylene ether) glycol and caprolactone or polycaprolactone is from about 20 to about 50% and each of the poly(alkylene ether) glycol and caprolactone or polycaprolactone is present in an amount of from about 10 to about 30% by weight based on the total composition.

4. The composition of claim 1 wherein the second diol is selected from the group consisting of 1,4-butenediol, 1,6-hexanediol and 1,4-cyclohexanedimethanol.

5. The composition of claim 1 wherein the diol is 1,4-butanediol.

6. The composition of claim 1 wherein the acid component is a mixture of terephthalic acid and/or dimethylterephthalate and a second dicarboxylic acid selected from the group consisting of azelaic acid, isophthalic acid, glutaric acid, a cyclohexanedicarboxylic acid or the ester derivatives thereof.

7. The composition of claim 1 wherein the dicarboxylic acid is dimethylterephthalate.

8. The composition of claim 1 wherein the poly(alkylene ether) glycol is poly(tetramethylene ether) glycol of average molecular weight of from about 900 to about 2500.

9. The composition of claim 1 which further contains a stabilizer.

10. The composition of claim 8 wherein the stabilizer is 3,5-di-tert-butyl-4-hydroxyhydrocinnamic acid triester with 1,3,5-tris-(2-hydroxyethyl)-3-triazine-2,4,6-(1H,3H,5H) trione.

11. The composition of claim 1 wherein the caprolactone (d) is epsilon caprolactone.

12. The composition of claim 1 wherein the caprolactone (d) is polycaprolactone.

13. The composition of claim 1 wherein the dicarboxylic acid is terephthalic acid, dimethylterephthalate or a mixture thereof.

14. The composition of claim 1 wherein the poly(alkylene ether) glycol is selected from the group consisting of poly(ethylene ether) glycol, poly(propylene ether) glycol, copoly(ethylene ether-propylene ether) glycol, and poly(tetramethylene ether) glycol.

15. The composition of claim 1 wherein the poly(alkylene ether) glycol is poly(tetramethylene ether) glycol.

16. A copolyether ester elastomer molding composition consisting essentially of the reaction product of: (a) 1,4-butanediol; (b) dimethylterephthalate; (c) from about 5 to about 50% by weight, based on the total composition, of poly(tetramethylene ether) glycol having an average molecular weight of from about 900 to about 2500; and, (d) from about 5 to about 50% by weight, based on the total composition, of caprolactone or polycaprolactone, wherein the combined weight of (c) and (d) is from about 10 to about 65% by weight based on the total composition.

17. The composition of claim 4 wherein the poly(tetramethylene ether) glycol and caprolactone or polycaprolactone are each present in an amount of from about 10 to about 30% by weight, based on the total composition and the combined weight of (c) and (d) is from about 20 to about 50% by weight, based on the total composition.

18. The composition of claim 16 wherein the caprolactone (d) is epsilon caprolactone.

19. The composition of claim 4 wherein the caprolactone (d) is polycaprolactone.

* * * * *